United States Patent [19]

Bourgogne et al.

[11] Patent Number: 4,503,024

[45] Date of Patent: Mar. 5, 1985

[54] PROCESS FOR THE PREPARATION OF SYNTHETIC ZEOLITES, AND ZEOLITES OBTAINED BY SAID PROCESS

[75] Inventors: Michel Bourgogne, Riedisheim; Jean-Louis Guth, Brunstatt; Raymond Wey, Mulhouse, all of France

[73] Assignee: Compagnie Francaise de Raffinage, Paris, France

[21] Appl. No.: 417,793

[22] Filed: Sep. 13, 1982

[30] Foreign Application Priority Data

Sep. 14, 1981 [FR] France .................................. 81 17343

[51] Int. Cl.$^3$ .................................................... C01B 33/28
[52] U.S. Cl. ...................................... 423/328; 423/118; 423/329; 502/71
[58] Field of Search ....................... 423/328, 118, 329; 252/455 Z; 502/77, 60

[56] References Cited

U.S. PATENT DOCUMENTS

| | | | |
|---|---|---|---|
| 3,101,251 | 8/1963 | Howell | 423/118 |
| 3,431,218 | 3/1969 | Plank et al. | 423/118 |
| 3,663,164 | 5/1972 | Barrer et al. | 423/118 |
| 3,702,886 | 11/1972 | Argauer et al. | 423/328 |
| 3,709,979 | 1/1973 | Chu | 423/328 |
| 3,733,390 | 5/1973 | Robson | 423/328 |
| 3,852,411 | 12/1974 | Maness | 423/328 |

OTHER PUBLICATIONS

*Hydrothermal Chemistry of Zeolites*, R. M. Barrer Academic Press, London, (1982), pp. 239–246.

*Primary Examiner*—William R. Dixon, Jr.
*Assistant Examiner*—Steven Capella
*Attorney, Agent, or Firm*—Curtis, Morris & Safford

[57] ABSTRACT

The invention relates to the preparation of synthetic zeolites selected from the group formed by chabazite, merlinoite, edingtonite, ZSM 5 and ZSM 11.

In accordance with the invention, a zeolite selected from the group formed by mordenite, ferrierite, clinoptilolite and the type X and type Y zeolites is subjected to a treatment with at least one base.

The invention further relates to zeolites obtained by said process.

35 Claims, No Drawings

PROCESS FOR THE PREPARATION OF SYNTHETIC ZEOLITES, AND ZEOLITES OBTAINED BY SAID PROCESS

The present invention relates to a process for the preparation of synthetic zeolites. The invention further relates to zeolites obtained by said process.

The zeolites form a family of alkaline or alkaline-earth aluminosilicates comprising several dozen compounds, some of which occur naturally.

The structure of the zeolites may be defined as a three-dimensional framework of tetrahedra of the formula $SiO_4$ and $AlO_4$ linked by oxygen bridges. That framework, whose geometry varies from one zeolite to another, defines an array of cavities interconnected by channels or pores whose dimensions vary from one zeolite to another but are uniform in a given zeolite. These cavities are occupied by water, ions or molecules having a high degree of freedom of movement.

Zeolites can be differentiated from one another by their chemical composition and, more particularly and precisely, by their X-ray diffraction spectra.

Their X-ray diffraction spectra make it possible to calculate the spacings d between the lattice planes of the crystals, expressed in angstroms (A), and the intensities of the lines of the diffraction pattern relative to the strongest line.

Minor modifications of the lattice spacings and of the intensities observable in some patterns are due to the replacement of certain cations by others or to variations in the $SiO_2/Al_2O_3$ ratio; however, they do not indicate a structural variation in the zeolite.

The specific pore size of a given zeolite enables it to either adsorb or exclude molecules, depending on their polarizabilities.

Zeolites have therefore been used for the separation of different compounds, for example, in the drying or purification of gases. They are further being used as catalysts or supports for catalysts for the conversion of compounds, for example, in hydrocarbon cracking, alkylation or isomerization reactions.

The remarkable properties of zeolites have led to the development of processes for the production of synthetic zeolites. There are many of these and they form the subject matter of many patents and publications.

Synthetic zeolites are commonly designated by a symbol, such as the zeolites A, X, Y, W, ZSM 5, ZSM 11, ZSM 12, etc.

The patents relating to the preparation of synthetic zeolites include the following:

French Pat. No. 1,117,776 for zeolite A,
French Pat. No. 1,117,756 for zeolite X,
French Pat. No. 1,231,239 for zeolite Y,
British Pat. No. 574,991 for chabazite,
U.S. Pat. No. 3,012,853 for zeolite W,
French Pat. No. 1,212,146 for zeolite F,
U.S. Pat. No. 3,709,979 for zeolite ZSM 11, and
U.S. Pat. No. 3,702,886 for zeolite ZSM 5.

The first six zeolites cited correspond to natural zeolites, zeolites X and Y, for example, being faujasites, zeolite W a merlinoite, and zeolite F an edingtonite. The last two, zeolites ZSM 11 and ZSM 5, do not occur naturally.

Other natural zeolites have also been synthesized.

The synthesis of mordenite is described in an article by R. M. Barrer in The Journal of the Chemical Society, 1948, page 2158.

The synthesis of ferrierite is described in an article by J. P. Giannetti and A. J. Perrotta, "Selective Hydrocracking with Ferrierite-based Catalysts", which appeared in Industrial Engineering Chemistry, Process Design and Development, volume 14, No. 1 (1975).

The synthesis of clinoptilolite is described in an article by D. B. Hawkins in Clays and Clay Minerals, volume 29, pages 331-340 (1981).

Generally, zeolites are prepared by reacting a sodium silicate and/or silica, for example, with a sodium aluminate, in the case of a sodium zeolite, under well-defined operating conditions and with specific ratios between the precursors of the zeolites.

The applicants propose a simple means of preparing synthetic zeolites from other zeolites, whether synthetic or natural, and particularly from zeolites which are already conditioned.

An embodiment of the invention thus is a process for the preparation of synthetic zeolites selected from the group formed by chabazite, merlinoite, edingtonite, ZSM 5 and ZSM 11, said process being characterized in that a zeolite selected from the group formed by mordenite, ferrierite, clinoptilolite and the zeolites X and Y is subjected to treatment with at least one base.

In accordance with the invention, a type X or type Y faujasite, a ferrierite, a clinoptilolite or a mordenite is used as the starting material.

The general formula of sodium faujasite is:

$$1 \pm 0.2 Na_2O/Al_2O_3/2 \text{ to } 6SiO_2/zH_2O \text{ with } 0 \leq z \leq 9.$$

For the type X faujasite, the $SiO_2/Al_2O_3$ ratio is between 2 and 3.

For the type Y faujasite, the $SiO_2/Al_2O_3$ ratio is higher, namely, between 3 and 6.

The x-ray diffraction spectra of the type X and type Y zeolites are given in French Pat. Nos. 1,117,756 and 1,231,239, respectively, to which reference may be had.

The general formula of mordenite is:

$$M_{2/n}O/Al_2O_3/8 \text{ to } 10SiO_2/0 \text{ to } 6H_2O,$$

where M represents the cations generally present in natural or synthetic zeolites, such as alkali or alkaline-earth cations, for example, and n represents the valence of the cation.

The X-ray diffraction spectrum of mordenite is given in the article by R. M. Barrer which appeared in The Journal of the Chemical Society, 1948, page 2158.

The general formula of clinoptilolite is:

$$M_{2/n}O/Al_2O_3/8 \text{ to } 11SiO_2/0 \text{ to } 7H_2O,$$

where M represents the cations generally present in natural or synthetic zeolites, such as alkali or alkaline-earth cations, for example, and n represents the valence of the cation.

The X-ray diffraction spectrum of clinoptilolite is given in an article by L. L. Ames, Jr., L. B. Sand and S. S. Goldich which appeared in Economic Geology, vol. 53, pp. 22-37 (1958).

The general formula of ferrierite is:

$$M_{2/n}O/Al_2O_3/10SiO_2/0 \text{ to } 7H_2O,$$

where M represents the cations generally present in natural or synthetic zeolites, such as alkali or alkaline-earth cations, for example, and n represents the valence of the cation.

The x-ray diffraction spectrum of ferrierite is given in an article by R. M. Barrer and D. J. Marshall which appeared in the American Mineralogist, vol. 50, pp. 484–489 (1965).

The type X and type Y zeolites, the mordenite, the ferrierite and the clinoptilolite may, prior to their treatment with a base, undergo a treatment for exchange of the cation or cations which they contain.

For example, the sodium ions of a sodium faujasite may be exchanged with potassium, lithium or hydrogen ions.

This treatment may be carried out by treating the faujasite with a salt, for example, a potassium salt, or by treating it with an acid such as hydrochloric acid when the sodium ions are to be replaced by hydrogen ions.

Hydrogen ions can also be introduced by first replacing the sodium ions with ammonium ions and then calcining the zeolite.

Prior to the basic treatment, silica may be added to the zeolite to increase the $SiO_2/Al_2O_3$ ratio.

The basic treatment may be carried out with an inorganic base and/or an organic base.

For example, to obtain chabazite, merlinoite or edingtonite, an inorganic base such as lithium hydroxide or potassium hydroxide may be used, depending on the zeolite to be prepared.

To obtain ZSM 5 and ZSM 11, sodium hydroxide may be used together with an organic base, tetrapropylammonium hydroxide for ZSM 5 and tetrabutylammonium hydroxide for ZSM 11.

The concurrent use of sodium hydroxide and the base is not always necessary.

Using the process in accordance with the invention, the applicants have successfully prepared a number of zeolites from type X and type Y sodium faujasite, from mordenite, ferrierite and clinoptilolite.

The operating conditions for the preparation by the process of the invention of chabazite, merlinoite and edingtonite are given in Table 1 which follows.

TABLE 1

| Starting zeolite | End-product zeolite | A Range Broad | A Range Preferred | B Range Broad | B Range Preferred | C Range Broad | C Range Preferred | D Range Broad | D Range Preferred |
|---|---|---|---|---|---|---|---|---|---|
| Sodium Y | Chabazite | 0.1 to 6 | 0.5 to 3.5 | 3.5 to 10 | 3.8 to 8 | >70% | >80% | 2 to 20 | 3 to 12 |
| Sodium Y or sodium X | Merlinoite | 0.1 to 10 | 0.5 to 6 | 2 to 10 | 2 to 8 | >70% | >80% | 2 to 20 | 8 to 12 |
| Sodium X | Edingtonite | 0.1 to 10 | 0.5 to 6 | 1.8 to 2.4 | 1.9 to 2.2 | >70% | >80% | 2 to 20 | 3 to 8 |

| Starting zeolite | End-product zeolite | E Range Broad | E Range Preferred | F Range Broad | F Range Preferred | G Range Broad | G Range Preferred | H Range Broad | H Range Preferred |
|---|---|---|---|---|---|---|---|---|---|
| Sodium Y | Chabazite | $\frac{M}{1000}$ to 4M | $\frac{M}{100}$ to 0.8M | 1 to 0 | 0.8 to 0 | 80 to 250 | 90 to 150 | 4 to 360 | 6 to 100 |
| Sodium Y or sodium X | Merlinoite | $\frac{M}{100}$ to 4M | $\frac{M}{20}$ to 2M | 0.9 to 0 | 0.8 to 0 | 80 to 300 | 90 to 260 | 4 to 360 | 6 to 100 |
| Sodium X | Edingtonite | $\frac{M}{100}$ to 2M | $\frac{M}{10}$ to M | 0.8 to 0 | 0.5 to 0 | 80 to 250 | 90 to 150 | 4 to 360 | 6 to 120 |

A = Crystal size in microns immediately before the treatment with a base, in other words, after such optional treatments as cation exchange.
B = $SiO_2/Al_2O_3$ ratio of starting zeolite.
C = $M/M + Na^+$ exchange ratio. $M = Li^+, NH_4^+, K^+, H^+$.
D = Liquid/solid ratio by weight upon treatment with a base.
E = Molar concentration of base.
F = $Li^+/Li^+$ plus $K^+$ ratio. ($Li^+ = Li^+$ ions of lithium hydroxide when a zeolite containing $K^+$ potassium ions is acted upon by lithium hydroxide.)
G = Temperature, °C.
H = Time of treatment with base, hours.

The general formula of a chabazite prepared by the process of the invention is:

$$1 \pm 0.2 M_2O/Al_2O_3/3.7 \text{ to } 6SiO_2/4 \text{ to } 8H_2O,$$

where M may be potassium, a mixture of potassium and lithium, a mixture of potassium and sodium, a mixture of potassium, lithium and sodium, or a mixture of lithium and sodium.

Its X-ray diffraction pattern is given in Table 2 which follows, where d is the spacing between two lattice planes, expressed in A, and $I/I_o$ the ratio between the relative intensity I and the strongest intensity $I_o$.

TABLE 2

| d (A) | $I/I_o$ |
|---|---|
| 9.34 | 46 |
| 6.85 | 14 |
| 5.53 | 10 |
| 5.02 | 15 |
| 4.68 | 6 |
| 4.31 | 48 |
| 3.97 | 7 |
| 3.87 | 31 |
| 3.606 | 16 |
| 3.446 | 10 |
| 3.236 | 7 |
| 3.192 | 8 |
| 3.124 | 6 |
| 3.03 | 3 |
| 2.924 | 100 |
| 2.892 | 48 |
| 2.772 | 6 |
| 2.689 | 6 |
| 2.604 | 19 |
| 2.576 | 7 |
| 2.510 | 12 |

Chabazite may be used in catalysts for the conversion of methanol to olefins and the separation of branched-chain hydrocarbons from straight-chain hydrocarbons.

The general formula of a merlinoite prepared by the process of the invention is:

$$1 \pm 0.2 M_2O/Al_2O_3/2.2 \text{ to } 6SiO_2/3.5 \text{ to } 4.5H_2O,$$

where M may be a potassium cation, a mixture of potassium and lithium cations, a mixture of potassium and sodium cations, a mixture of potassium, lithium and sodium cations, or a mixture of lithium and sodium cations.

Its X-ray diffraction pattern is given in Table 3 below:

TABLE 3

| d (A) | I/I$_o$ |
|---|---|
| 9.97 | 9 |
| 8.16 | 30 |
| 7.01 | 47 |
| 5.36 | 31 |
| 4.97 | 33 |
| 4.46 | 18 |
| 4.26 | 19 |
| 4.06 | 9 |
| 3.650 | 17 |
| 3.536 | 4 |
| 3.238 | 100 |
| 3.158 | 96 |
| 2.949 | 68 |
| 2.764 | 11 |
| 2.724 | 48 |
| 2.672 | 20 |
| 2.540 | 24 |
| 2.504 | 6 |
| 2.428 | 11 |

The general formula of edingtonite prepared by the process of the invention is:

$$1 \pm 0.2 M_2O/Al_2O_3/1.8 \text{ to } 2.2SiO_2/0 \text{ to } 3.5H_2O,$$

where M may be a mixture of potassium and lithium cations, a mixture of potassium and sodium cations, a mixture of potassium, sodium and lithium cations, or a mixture of lithium and sodium cations.

Its X-ray diffraction pattern is given in Table 4 below:

TABLE 4

| d (A) | I/I$_o$ |
|---|---|
| 6.94 | 100 |
| 6.47 | 20 |
| 5.36 | 2 |
| 4.76 | 16 |
| 3.94 | 4 |
| 3.64 | 7 |
| 3.477 | 16 |
| 3.264 | 16 |
| 3.105 | 10 |
| 3.072 | 92 |
| 2.952 | 49 |
| 2.807 | 84 |
| 2.720 | 9 |

Edingtonite, which is related to the type F zeolite, may be used particularly for the removal of ammonium ions from aqueous solutions containing them, and therefore in the treatment of polluted waters.

The operating conditions for the preparation by the process of the invention of the zeolites ZSM 5 and ZSM 11 from type X and type Y faujasites, from mordenite, clinoptilolite and ferrierite are given in Table 5 which follows.

TABLE 5

| | | PARAMETERS | | | | | |
|---|---|---|---|---|---|---|---|
| Starting zeolite | End-product zeolite | A Range | | I Range | | J Range | |
| | | Broad | Preferred | Broad | Preferred | Broad | Preferred |
| Sodium X or mordenite, clinoptilolite; ferierite | ZSM 11 | 0.1 to 10 | 0.5 to 6 | 10 to 200 | 20 to 150 | 30 to 500 | 50 to 300 |
| | ZSM 5 | 0.1 to 10 | 0.5 to 6 | 10 to 200 | 20 to 150 | 10 to 500 | 30 to 300 |

| | | PARAMETERS | | | | | | | | |
|---|---|---|---|---|---|---|---|---|---|---|
| Starting zeolite | End-product zeolite | K Range | | L Range | | M Range | | G Range | | H Range | |
| | | Broad | Preferred | Broad | Preferred | Broad | Preferred | Broad | Preferred | Broad | Preferred |
| Sodium X or sodium Y Mordenite | ZSM 11 | 0.05 to 0.6 | 0.1 to 0.4 | 0.01 to 0.5 | 0.05 to 0.3 | 0.9 to 0.05 | 0.7 to 0.3 | 100 to 200 | 120 to 180 | 7 to 170 | 20 to 120 |
| Clinoptilolite Ferrierite | ZSM 5 | 0.05 to 1 | 0.2 to 0.8 | 0.01 to 0.8 | 0.05 to 0.2 | 0.9 to 0.05 | 0.8 to 0.1 | 100 to 200 | 120 to 180 | 7 to 170 | 20 to 120 |

A = Crystal size in microns immediately before the treatment with a base, in other words, after such optional treatments as cation exchange.
I = SiO$_2$/Al$_2$O$_3$ ratio of reaction mixture conversion.
J = H$_2$O/OH$^-$ molar ratio.
K = Molar ratio OH$^-$/SiO$_2$.
L = Molar ratio R$_4$N$^+$/SiO$_2$, with R = C$_4$H$_9$ for preparation of ZSM 11 or R = C$_3$H$_7$ for preparation of ZSM 5.
M = Molar ratio M/M + R$_4$N$^+$ (M = Na$^+$,Li$^+$,K$^+$,H$^+$).
G = Temperature, °C.
H = Time of treatment with base, hours.

Merlinoite, which is related to the type W zeolite, may be used particularly for the removal of ammonium ions from aqueous solutions containing them, and therefore in the treatment of polluted waters.

The general formula of a ZSM 5 prepared by the process of the invention is:

$$1 \pm 0.2 M_2O/Al_2O_3/10 \text{ to } 100SiO_2/0 \text{ to } 50H_2O,$$

where M may be a tetrapropylammonium cation, a mixture of sodium and tetrapropylammonium cations, a mixture of potassium and tetrapropylammonium cations, a mixture of lithium and tetrapropylammonium cations, a mixture of potassium, sodium and tetrapropylammonium cations, or a mixture of lithium, sodium and tetrapropylammonium cations.

Its X-ray diffraction pattern is given in Table 6 below:

TABLE 6

| d (A) | $I/I_o$ |
|---|---|
| 11.04 | 56 |
| 10.05 | 35 |
| 9.73 | 14 |
| 8.90 | 3 |
| 8.06 | 9 |
| 7.43 | 8 |
| 7.07 | 3 |
| 6.69 | 4 |
| 6.36 | 9 |
| 6.04 | 9 |
| 5.69 | 7 |
| 5.56 | 10 |
| 5.36 | 1 |
| 5.14 | 2 |
| 4.99 | 5 |
| 4.59 | 7 |
| 4.34 | 8 |
| 4.25 | 10 |
| 4.00 | 7 |
| 3.835 | 100 |
| 3.757 | 34 |
| 3.719 | 43 |
| 3.645 | 30 |
| 3.439 | 11 |
| 3.329 | 9 |
| 3.259 | 4 |
| 3.049 | 10 |
| 2.982 | 15 |
| 2.949 | 6 |
| 2.864 | 2 |
| 2.733 | 4 |
| 2.606 | 5 |
| 2.488 | 5 |
| 2.398 | 4 |

The general formula of a ZSM 11 prepared by the process of the invention is:

$1 \pm 0.2 M_2O/Al_2O_3/10$ to $100 SiO_2/0$ to $50 H_2O$, where M may be a tetrabutylammonium cation, a mixture of sodium and tetrabutylammonium cations, a mixture of potassium and tetrabutylammonium cations, a mixture of lithium and tetrabutylammonium cations, a mixture of potassium, sodium and tetrabutylammonium cations, a mixture of potassium, sodium and tetrabutylammonium cations, or a mixture of lithium, sodium and tetrabutylammonium cations.

Its X-ray diffraction pattern is given in table 7 below:

TABLE 7

| d (A) | $I/I_o$ |
|---|---|
| 11.10 | 52 |
| 9.99 | 41 |
| 7.45 | 5 |
| 7.08 | 2 |
| 6.71 | 5 |
| 6.37 | 3 |
| 5.58 | 6 |
| 5.11 | 2 |
| 4.99 | 4 |
| 4.60 | 7 |
| 4.36 | 11 |
| 3.99 | 6 |
| 3.84 | 100 |
| 3.72 | 43 |
| 3.48 | 6 |
| 3.34 | 7 |
| 3.191 | 3 |
| 3.060 | 11 |
| 2.989 | 13 |
| 2.868 | 3 |
| 2.611 | 4 |
| 2.546 | 2 |
| 2.492 | 6 |
| 2.453 | 3 |
| 2.417 | 3 |
| 2.397 | 3 |

The zeolites ZSM 5 and ZSM 11 prepared by the process of the invention may be used as hydrocarbon conversion catalysts.

The invention makes it possible to obtain chabazites higher in silica than those prepared up to now, in which the maximum $SiO_2/Al_2O_3$ ratio is 4.9. (See, for example, French Pat. No. 1,211,594.) An increase in that ratio is an advantage in catalysis.

The invention further permits merlinoites to be obtained whose $SiO_2/Al_2O_3$ ratio extends over a broader range than it does in the ones prepared up to now, 3.58 to 4.97 in French Pat. No. 1,201,828.

A higher ratio is preferable in catalysis while a lower ratio tends to increase the exchange capacity, particularly for the removal of ammonium ions.

Moreover, the invention permits well-crystallized zeolites to be obtained reproducibly since the starting zeolite is well crystallized. With the conventional processes for the preparation of zeolites, difficulties are always encountered in producing the same gel, and even within a given gel there are often inhomogeneities which may result in undesired zeolites or impurities.

In addition, the invention makes it possible to transform zeolites which have been previously conditioned, that is to say, agglomerated (into pellets, granules, extrudates, etc.) without a binder. This shaping of zeolites is done by prior-art processes. The pressure used should not exceed 10 tons/cm². Agglomeration of the powder may optionally be effected in the presence of water, in which case the mass of the water should not exceed 50% of the mass of the zeolite involved. The transformation of these agglomerated zeolites into novel zeolites by the process of the invention strengthens their agglomeration and thus does away with the need to condition the zeolites obtained.

The eleven examples which follow will illustrate the invention without limiting it in any way. They relate to the preparation of chabazite, merlinoite, edingtonite, ZSM 11 and ZSM 5 from agglomerated and nonagglomerated zeolites, respectively.

EXAMPLE 1

This example relates to the preparation of chabazite.

Procedure 1

300 g of type Y sodium zeolite having an $SiO_2/Al_2O_3$ ratio of 4.2 and a crystal size ranging from 1 to 3 microns was used as the starting material.

This 300 g of type Y sodium zeolite was suspended in 1 liter of a molar (M) aqueous solution of potassium nitrate for 24 hours at 60° C.

After filtration, the solids were suspended once more in 1 liter of a molar (M) aqueous solution of potassium nitrate at 60° C. for 24 hours. The suspension was filtered and this operation was repeated twice.

The solid was then washed with water and dried at 100° C.

Thus a type Y potassium zeolite was obtained at a rate of exchange of $Na^+$ ions for $K^+$ ions of 95%.

To 750 mg of the type Y potassium zeolite so obtained there was added 2.5 ml of an M/2 solution of LiOH. The liquid/solid ratio was 3.3.

The suspension was heated to 100° C. in a sealed glass tube over a period of 72 hours. This was followed by filtering, washing with water, and drying.

The chabazite so obtained had the formula $$0.90K_2O/0.06Na_2O/0.15Li_2O/Al_2O_3/4.15SiO_2/5.8H_2O,$$

as identified by its X-ray diffraction spectrum.

Procedure 2

750 mg of type Y potassium zeolite obtained as under procedure 1 and having an $SiO_2/Al_2O_3$ ratio of 4.2 and a crystal size ranging from 2 to 4 microns was used as starting material. This 750 mg of type Y potassium zeolite was pelletized at a pressure of 120 kgf/cm² without binder.

The pellets so obtained were brought into contact with 2.5 ml of an M/20 lithium hydroxide solution in a 12.5-ml autoclave. The autoclave was heated to 150° C. over a period of 72 hours. After filtering, washing with water and drying, 650 mg of a chabazite analogous to that obtained by procedure 1 was obtained.

Procedure 3

50 g of a type Y sodium zeolite having an $SiO_2/Al_2O_3$ ratio of 4 and a crystal size ranging from 3 to 5 was used.

This 50 g was suspended in a molar (M) solution of ammonium nitrate at 80° C. for 4 hours.

After filtration, the solid was washed with water and dried for 4 hours at 80° C., then heated to 180° C. over a period of 16 hours. This operation was repeated three times.

The solid was then suspended in an M/2 ammonia solution for 2 hours at 80° C. This was followed by washing with water and drying at 40° C.

In all of the above operations, the liquid/solid ratio was 4.

Thus a type Y $NH_4$ zeolite was obtained, which was calcined for 2 hours at 550° C. to give 32.8 g of a Y type H zeolite.

The rate of exchange of $Na^+$ ions for $H^+$ ions was 95%.

This 32.8 g of Y type H zeolite was treated with 328 ml of a molar potassium hydroxide solution with a liquid/solid ratio of 10 at 100° C. for 96 hours in a polytetrafluoroethylene beaker placed in an autoclave.

Thus 43.7 g of chabazite was obtained which had the formula $$0.95K_2O/0.05Na_2O/Al_2O_3/4.23SiO_2/4.11H_2O,$$

as identified by its X-ray diffraction spectrum.

Procedure 4

To 1 g of a Y type H zeolite prepared as under procedure 3 there were added 1.64 g of colloidal silica (with 13.4 weight percent silica) and 10 ml of a molar potassium hydroxide solution to give a liquid/solid ratio of 9.4 and an overall $SiO_2/Al_2O_3$ ratio of 6.

The mixture was placed for 72 hours at 100° C. in a polytetrafluoroethylene container.

Thus 1.15 g of chabazite was obtained whose crystal size ranged from 3 to 5 microns and which had the formula $$1.01K_2O/0.04Na_2O/Al_2O_3/4.75SiO_2/3.94H_2O,$$

as identified by its X-ray diffraction spectrum.

Procedure 5

To 1 g of Y type H zeolite prepared as under procedure 3 there were added 3.3 g of colloidal silica (with 13.4 weight percent silica) and 12 ml of a molar potassium hydroxide solution to give a liquid/solid ratio of 10.3 and an overall $SiO_2/Al_2O_3$ ratio of 8.

The mixture was placed for 72 hours at 100° C. in a polytetrafluoroethylene container. Thus 1.16 g of chabazite was obtained which had the formula $$0.94K_2O/0.05Na_2O/Al_2O_3/5.3SiO_2/6.18H_2O.$$

Procedure 6

1 g of a Y type H zeolite prepared as under procedure 3 was pelletized at a pressure of 120 kgf/cm² without binder. The pellets so obtained, which had an average diameter of 5 mm, were placed in a solution containing 3.3 g of colloidal silica (with 13.4 weight percent silica) and 12 ml of a molar potassium hydroxide solution to give a liquid/solid ratio of 10.3 and an overall $SiO_2/Al_2O_3$ ratio of 8.

The mixture was placed for 96 hours at 100° C. in a polytetrafluoroethylene container. Thus 1.28 g of a chabazite identical to that prepared by procedure 5 was obtained.

Procedure 7

1 g of a Y type Na zeolite with a crystal size ranging from 3 to 5 microns was treated with 5 ml of a 2M aqueous solution of hydrochloric acid for 2 hours at ambient temperature without agitation.

To the Y type H zeolite so obtained there was added 4 ml of a molar aqueous solution of potassium hydroxide having a liquid/solid ratio of 16.

This treatment was carried out at 100° C. for 72 hours in a sealed glass tube. Thus there was obtained 117 mg of chabazite of the formula $$0.07Na_2O/0.87K_2O/Al_2O_3/5.03SiO_2/7.57H_2O,$$

as identified by its X-ray diffraction spectrum.

EXAMPLE 2

This example relates to the preparation of merlinoite.

Procedure 1

50 g of Y type K zeolite was used which had been obtained as under procedure 1 but from Y type Na zeolite crystals ranging in size from 3 to 5 microns.

To this 50 g of Y type K zeolite having an $SiO_2/Al_2O_3$ ratio of 4 there was added 500 ml of an M/10 aqueous lithium hydroxide solution to give a liquid/solid ratio of 10.

The mixture was treated at 150° C. for 360 hours in a polytetrafluoroethylene container placed in an autoclave. Thus there was obtained 42.2 g of merlinoite of the formula $$0.95K_2O/0.05Na_2O/0.09Li_2O/Al_2O_3/4.34SiO_2/3.7H_2O.$$

Procedure 2

To 43 g of Y type K zeolite as obtained by procedure 1 in Example 2 there was added 2.15 g of precipitated silica containing 84% anhydrous silica. Thus mixture A was obtained.

To 50 ml of a molar aqueous solution of lithium hydroxide there was added 5 g of precipitated silica containing 16% water. This was made up with water to 500 ml. Thus solution B was obtained.

Mixture A, whose $SiO_2/Al_2O_3$ ratio was 5.39, was suspended in 430 ml of solution B in a polytetrafluoroethylene container placed in an autoclave at 150° C. for 360 hours.

Thus 46.7 g of merlinoite was obtained which had the formula $$0.94K_2O/0.04Na_2O/0.15Li_2O/Al_2O_3/4.72SiO_2/4.10H_2O,$$

as identified by its X-ray diffraction spectrum.

Procedure 3

The operating procedure was idential to procedure 2, except that the temperature was 250° C. and the time, 72 hours. Thus a merlinoite was obtained which had the formula $$0.96K_2O/0.06Na_2O/0.16Li_2O/Al_2O_3/5.3SiO_2/3.89H_2O.$$

Procedure 4

The starting material was an X type Na zeolite with an $SiO_2/Al_2O_3$ ratio of 2.2 and a crystal size ranging from 1 to 3 microns.

The Na+ ions were exchanged with K+ ions in the same manner as under procedure 1 in Example 1.

To 500 mg of the X type K zeolite so obtained there was added 2 ml of an M/2 lithium hydroxide solution. The mixture was treated in a sealed glass tube at 100° C. for 72 hours.

Thus 355 mg of merlinoite was obtained which had the formula $$0.75K_2O/0.08Na_2O/0.36Li_2O/Al_2O_3/3.83SiO_2/4.38H_2O.$$

Procedure 5

The starting material was 400 mg of an X type K zeolite with an $SiO_2/Al_2O_3$ ratio of 2.2, prepared according to procedure 4. To this 400 mg of X type K zeolite there were added 0.37 ml of colloidal silica (with 15 mg $SiO_2$), 0.63 ml water, and 1 ml of a molar solution of lithium hydroxide. The mixture was treated in a polytetrafluoroethylene flask at 100° C. for 86 hours.

After filtering, washing and drying at 60° C., 300 mg of merlinoite with an $SiO_2/Al_2O_3$ ratio of 2.4 was obtained.

Procedure 6

The starting material was 400 mg of an X type K zeolite with an $SiO_2/Al_2O_3$ ratio of 2.2 prepared according to procedure 4. To this 400 mg of X type K zeolite there were added 0.63 ml of colloidal silica (with 24 mg $SiO_2$), 0.37 ml water and 1 ml of a molar solution of lithium hydroxide. The mixture was treated in a polytetrafluoroethylene flask at 100° C. for 86 hours.

Thus 320 mg of merlinoite with an $SiO_2/Al_2O_3$ ratio of 2.6 was obtained.

After exchange of the potassium ions with sodium ions, this sample, placed in an aqueous solution containing ammonium ions, had a selectivity coefficient $$\alpha_{Na+}^{NH_4+}$$

of 14 for a value of R=0.1 at 20° C., R being the ammonium ionic fraction of the solution in equilibrium with the zeolite, $$\alpha_{Na+}^{NH_4+}$$

being defined by the relation $$\alpha_{Na+}^{NH_4+} = \frac{NH_4(Z) \, Na(s)}{Na(Z) \, NH_4(s)},$$

where Na (s) and NH4 (s) are the concentrations at equilibrium of the sodium ions and ammonium ions, respectively, in the solution, Na (z) and NH4 (z) being the concentrations at equilibrium of the sodium ions and ammonium ions, respectively, in the zeolite.

The high value of the coefficient α shows that this merlinoite is well suited for the removal of the ammonium ions contained in polluted waters.

EXAMPLE 3

This example relates to the preparation of edingtonite.

Procedure 1

The starting material used was an X type Na zeolite with an $SiO_2/Al_2O_3$ ratio of 2.15 and a crystal size ranging from 1 to 3 microns. The sodium ions were exchanged with potassium ions in accordance with procedure 1 of Example 1.

To 500 mg of the X type K zeolite so obtained there was added 2 ml of an M/2 solution of lithium hydroxide. The mixture was treated in a polytetrafluoroethylene container at 100° C. for 72 hours. Thus 400 mg of edingtonite was obtained.

Procedure 2

To 500 mg of the X type K zeolite obtained in accordance with procedure 1 of this example, there was added 2 ml of an M/5 solution of lithium hydroxide. The mixture was treated in a polytetrafluoroethylene container at 150° C. for 96 hours. Thus 307 mg of edingtonite containing merlinoite as an impurity was obtained.

EXAMPLE 4

This example relates to the preparation of ZSM 11 zeolite from type X or type Y zeolites.

Procedure 1

To 50 ml of water there were added 4.5 ml of a 40 weight percent solution of tetrabutylammonium hydroxide and 0.13 g sodium hydroxide in pellet form. 4.6 g of amorphous silica (with 16 wt. % water) was then dispersed in the solution so obtained.

To this dispersion there was added 400 mg of a Y type Na zeolite with an $SiO_2/Al_2O_3$ ratio of 4.2.

The overall $SiO_2/Al_2O_3$ ratio then was 92.

The mixture was heated to 165° C. over a period of 120 hours in a polytetrafluoroethylene container placed in an autoclave.

Thus 4.5 g of a ZSM 11 zeolite with an $SiO_2/Al_2O_3$ ratio of 81 was obtained.

Procedure 2

To 50 ml of water there were added 4.5 ml of a 40 wt. % solution of tetrabutylammonium hydroxide and 0.13 g of sodium hydroxide in pellet form. 2.3 g of amorphous silica (with 16 wt. % water) was then dispersed in the solution obtained.

To this dispersion there was added 200 mg of a Y type Na zeolite with an $SiO_2/Al_2O_3$ ratio of 4.

The overall $SiO_2/Al_2O_3$ ratio then was 91.5.

The mixture was heated to 165° C. over a period of 48 hours in a polytetrafluoroethylene container placed in an autoclave.

Thus 1.8 g of a ZSM 11 zeolite with an $SiO_2/Al_2O_3$ ratio of 77 was obtained.

Procedure 3

To 50 ml of water there were added 4.5 ml of a 40 wt. % solution of tetrabutylammonium hydroxide and 0.2 g of sodium hydroxide in pellet form. 7 g of amorphous silica (with 16 wt. % water) was then dispersed in the solution obtained.

To this dispersion there was added 400 mg of an X type Na zeolite with an $SiO_2/Al_2O_3$ ratio of 2.2.

The overall $SiO_2/Al_2O_3$ ratio then was 99.

The mixture was heated to 165° C. over a period of 120 hours in a polytetrafluoroethylene container placed in an autoclave.

Thus 6.25 g of a ZSM 11 zeolite with an $SiO_2/Al_2O_3$ ratio of 82 was obtained.

EXAMPLE 5

This example relates to the preparation of ZSM 5 zeolite from type X or type Y zeolites.

Procedure 1

To 150 ml of water there were added 9 ml of a 20 wt. % solution of tetrapropylammonium hydroxide and 1.5 g sodium hydroxide in pellet form. 9.6 g of amorphous silica (with 16 wt. % water) was then dispersed in the solution so obtained. To this dispersion there was added 720 mg of a Y type Na faujasite with an $SiO_2/Al_2O_3$ ratio of 4.2. The overall $SiO_2/Al_2O_3$ ratio then was 105. The mixture was heated to 165° C. over a period of 120 hours in a polytetrafluoroethylene container placed in an autoclave. Thus 6.9 g of a ZSM 5 zeolite was obtained.

Procedure 2

To 25 ml of water there were added 1.5 ml of a 20 wt. % solution of tetrapropylammonium hydroxide and 0.25 g sodium hydroxide in pellet form. 800 mg of amorphous silica (with 16 wt. % water) was then dispersed in the solution so obtained. To this dispersion there was added 60 mg of an X type Na faujasite with an $SiO_2/Al_2O_3$ ratio of 2.2. The overall $SiO_2/Al_2O_3$ ratio then was 76. The mixture was heated to 165° C. over a period of 156 hours in a polytetrafluoroethylene container placed in an autoclave. Thus 440 mg of a ZSM 5 zeolite was obtained.

Procedure 3

To 15 ml of water there was added 5 ml of a 20 wt. % solution of tetrapropylammonium hydroxide.

500 mg of amorphous silica (with 16 wt. % water) was then dispersed in the solution so obtained. To this dispersion there was added 240 mg of a Y type Na faujasite with an $SiO_2/Al_2O_3$ ratio of 4. The overall $SiO_2/Al_2O_3$ ratio then was 20.

The mixture was heated to 165° C. over a period of 108 hours in a polytetrafluoroethylene container placed in an autoclave. Thus 650 mg of a ZSM 5 zeolite was obtained.

Procedure 4

To 10 ml of water there were added 1.5 ml of a 20 wt. % solution of tetrapropylammonium hydroxide and 0.5 g sodium hydroxide in pellet form. 5.1 g of colloidal silica containing 30 wt. % silica was then dispersed in the solution so obtained. To this dispersion there was added 127 mg of a Y type Na faujasite with an $SiO_2/Al_2O_3$ ratio of 4 which had previously been pelletized under a pressure of 3 tons/cm². The overall $SiO_2/Al_2O_3$ ratio then was 109. The mixture was heated to 165° C. over a period of 108 hours in a polytetrafluoroethylene container placed in an autoclave. Thus 900 mg of a ZSM 5 zeolite was obtained.

EXAMPLE 6

This example relates to the preparation of ZSM 5 zeolite from mordenite.

Procedure 1

15 g of a synthetic mordenite in the form of extrudates was treated with an 8N solution of hydrochloric acid at 90° C. for 96 hours, the liquid/solid (volume/mass) ratio being 5:1.

10 g of the acidic mordenite so obtained, which had an $SiO_2/Al_2O_3$ ratio of 65, was then immersed in a solution prepared from 125 ml water, 9 ml of a 20 wt. % aqueous tetrapropylammonium hydroxide solution and 1.5 g sodium hydroxide in pellet form.

The mixture was heated to 170° C. over a period of 120 hours in a polytetrafluoroethylene flask placed in an autoclave.

Thus 9.5 g of a ZSM 5 zeolite with an $SiO_2/Al_2O_3$ ratio of 68 was obtained.

Procedure 2

To 990 ml of water there were added 66 ml of a 20 wt. % aqueous solution of tetrapropylammonium hydroxide, 12 g sodium hydroxide in pellet form and 90 g colloidal silica (with 40 wt. % silica). After homogenization, 30 g of acidic mordenite obtained in accordance with procedure 1 was immersed in the solution so obtained.

The overall SiO$_2$/Al$_2$O$_3$ ratio of the mixture was 157. This mixture was heated to 170° C. over a period of 96 hours in a polytetrafluoroethylene flask placed in an autoclave.

Thus 51 g of a ZSM 5 zeolite with an SiO$_2$/Al$_2$O$_3$ ratio of 103 was obtained.

EXAMPLE 7

This example relates to the preparation of ZSM 11 zeolite from mordenite.

20 g of acidic mordenite obtained in accordance with procedure 1 of Example 6 was immersed in a solution prepared from 90 ml water, 20 ml of a 40 wt. % aqueous solution of tetrabutylammonium hydroxide, and 0.4 g sodium hydroxide in pellet form.

The mixture was heated to 170° C. over a period of 120 hours in a polytetrafluoroethylene flask placed in an autoclave.

Thus 19 g of a ZSM 11 zeolite was obtained.

EXAMPLE 8

This example relates to the preparation of ZSM 5 zeolite from ferrierite.

To 700 ml water there was added 45 ml of a 20 wt. % aqueous solution of tetrapropylammonium hydroxide and 7.5 g sodium hydroxide in pellet form. After homogenization, there was dispersed in the solution so obtained 52 g of an intimate mixture of amorphous silica (32 g with 16 wt. % water) and 20 g synthetic ferrierite in powder form with an SiO$_2$/Al$_2$O$_3$ ratio of 10.

The overall SiO$_2$/Al$_2$O$_3$ ratio of the mixture was 30.

This mixture was heated to 165° C. over a period of 72 hours in a polytetrafluoroethylene flask placed in an autoclave.

Thus 39 g of a ZSM 5 zeolite containing traces of analcite was obtained.

EXAMPLE 9

This example relates to the preparation of ZSM 11 zeolite from ferrierite.

To 210 ml water there were added 47 ml of a 40 wt. % aqueous solution of tetrabutylammonium hydroxide and 1.4 g sodium hydroxide in pellet form. Aftr homogenization, there was dispersed in the solution so obtained 52 g of the silica and ferrierite mixture used in Example 8.

The mixture so obtained was heated to 165° C. over a period of 72 hours in a polytetrafluoroethylene placed in an autoclave.

Thus 41 g of a ZSM 11 zeolite was obtained.

EXAMPLE 10

This example relates to the preparation of ZSM 5 zeolite from clinoptilolite.

Procedure 1

30 g of a natural clinoptilolite in the form of ground and screened agglomerates of a particle size ranging from 1.4 to 2 mm was treated with a 4N solution of hydrochloric acid at 98° C. for 45 hours, the liquid/solid (volume/mass) ratio being 10:1.

25 g of the acidic clinoptilolite so obtained, which had an SiO$_2$/Al$_2$O$_3$ ratio of 25.5, was then immersed in a solution prepared from 325 ml water, 22.5 ml of a 20 wt. % aqueous solution of tetrapropylammonium hydroxide, and 3.7 g sodium hydroxide in pellet form.

The mixture was heated to 170° C. over a period of 96 hours in a polytetrafluoroethylene flask placed in an autoclave.

Thus 20 g of a ZSM 5 zeolite was obtained.

Procedure 2

30 g of the natural clinoptilolite used under procedure 1 was treated with an 8N solution of hydrochloric acid at 98° C. for 45 hours, the liquid/solid (volume/mass) ratio being 10:1.

25 g of the clinoptilolite so obtained, which had an SiO$_2$/Al$_2$O$_3$ ratio of 38.2, was then immersed in a solution containing water, tetrapropylammonium hydroxide and sodium hydroxide which was identical with that used in accordance with procedure 1.

The mixture was heated to 170° C. over a period of 96 hours in a polytetrafluoroethylene flask placed in an autoclave.

Thus 21.2 g of a ZSM 5 zeolite was obtained.

EXAMPLE 11

25 g of the natural clinoptilolite treated with hydrochloric acid in accordance with procedure 1 of Example 10 was immersed in a solution prepared from 105 ml water, 24 ml of a 40 wt. % aqueous solution of tetrabutylammonium hydroxide, and 0.7 g sodium hydroxide in pellet form.

The mixture was heated to 170° C. over a period of 96 hours in a polytetrafluoroethylene flask placed in an autoclave.

Thus 23.7 g of a ZSM 11 zeolite was obtained.

We claim:

1. A process for the preparation of synthetic ZSM 5 and ZSM 11 zeolites, said process comprising subjecting a zeolite selected from the group consisting of mordenite, ferrierite, clinoptilolite and the type X and type Y zeolites to a single treatment with two bases, the first base being selected from the group consisting of tetrapropylammonium hydroxide and tetrabutylammonium hydroxide, said first base being in mixture with sodium hydroxide as the second base.

2. A process for the preparation of synthetic ZSM 5 zeolite according to claim 1, wherein said first base is tetrapropylammonium hydroxide.

3. A process for the preparation of synthetic ZSM 11 zeolite according to claim 1, wherein said first base is tetrabutylammonium hydroxide.

4. A process according to claim 2, wherein the starting zeolite contains the cations which are generally present in natural or synthetic zeolites.

5. A process according to claim 2, wherein silica is added to the starting zeolite prior to the treatment with the bases.

6. A process according to claim 4, wherein silica is added to the starting zeolite prior to the treatment with the bases.

7. A process according to claim 4, wherein the cations present in the starting zeolite are exchanged with hydrogen, ammonium, lithium or potassium ions prior to the treatment with the bases.

8. A process according to claim 2, wherein the starting zeolite immediately prior to the treatment with the bases has a crystal size which ranges from 0.1 to 10 microns.

9. A process according to claim 2, wherein the starting zeolite immediately prior to the treatment with the bases has a crystal size which ranges from 0.5 to 6 microns.

10. A process according to claim 2, wherein the reaction mixture before conversion has a $SiO_2/Al_2O_3$ ratio which range from 10 to 200.

11. A process according to claim 2, wherein the reaction mixture before conversion has a $SiO_2/Al_2O_3$ ratio which ranges from 20 to 150.

12. A process according to claim 2, wherein the reaction medium has a molar ratio of $H_2O/OH^-$ which ranges from 10 to 500.

13. A process according to claim 2, wherein the reaction medium has a molar ratio of $H_2O/OH^-$ which ranges from 30 to 300.

14. A process according to claim 2, wherein the reaction medium has a molar ratio of $OH^-/SiO_2$ which ranges from 0.05 to 1.

15. A process according to claim 2, wherein the reaction medium has a molar ratio of $OH^-/SiO_2$ which ranges from 0.2 to 0.8.

16. A process according to claim 2, wherein the reaction medium has a molar ratio of $R_4N^+/SiO_2$ which ranges from 0.01 to 0.8 and where R is $C_3H_7$.

17. A process according to claim 2, wherein the reaction medium has a molar ratio of $R_4N^+/SiO_2$ which ranges from 0.05 to 0.2 and where R is $C_3H_7$.

18. A process according to claim 2, wherein the reaction medium has a molar ratio of $M/M+R_4N^+$ which ranges from 0.9 to 0.05 and where M is $Na^+$, $Li^+$, $K^+$ or $H^+$ and R is $C_3H_7$.

19. A process according to claim 2, wherein the reaction medium has a molar ratio of $M/M+R_4N^+$ which ranges from 0.8 to 0.1 and where M is $Na^+$, $Li^+$, $K^+$ or $H^+$ and R is $C_3H_7$.

20. A process according to claim 2, wherein the duration of the treatment with the bases ranges from 7 to 170 hours.

21. A process according to claim 2, wherein the duration of the treatment with the bases ranges from 20 to 120 hours.

22. A process according to claim 2, wherein the temperature of the treatment with the bases ranges from 100° to 200° C.

23. A process according to claim 2, wherein the temperature of the treatment with the bases ranges from 120° to 180° C.

24. A process according to claim 7, wherein the starting zeolite immediately prior to the treatment with the bases has a crystal size which ranges from 0.1 to 10 microns, the reaction mixture before conversion has a $SiO_2/Al_2O_3$ ratio which ranges from 10 to 200, has a molar ratio of $H_2O/OH^-$ which ranges from 10 to 500, has a molar ratio of $OH^-/SiO_2$ which ranges from 0.05 to 1, has a molar ratio of $R_4N^+/SiO_2$ which ranges from 0.01 to 0.8, has a molar ratio of $M/M+R_4N^+$ which ranges from ranges 0.9 to 0.05, the duration of the treatment with the bases ranges from 7 to 170 hours, the temperature of the treatment with the bases ranges from 100° to 200° C., and where R is $C_3H_7$ and M is $Na^+$, $Li^+$, $K^+$ or $H^+$.

25. A process according to claim 3, wherein the starting zeolite contains the cations which are generally present in natural or synthetic zeolites, the cations present in the starting zeolite are exchanged with hydrogen, ammonium, lithium or potassium ions prior to the treatment with the bases, the starting zeolite immediately prior to the treatment with the bases has a crystal size which ranges from 0.1 to 10 microns, the reaction mixture before conversion has a $SiO_2/Al_2O_3$ ratio which ranges from 10 to 200, has a molar ratio of $H_2O/OH^-$ which ranges from 30 to 500, has a molar ratio of $OH^-/SiO_2$ which ranges from 0.05 to 0.6, has a molar ratio of $R_4N^+/SiO_2$ which ranges from 0.01 to 0.5, has a molar ratio of $M/M+R_4N^+$ which ranges from 0.9 to 0.05, the duration of the treatment with the bases ranges from 7 to 170 hours, the temperature of the treatment with the bases ranges from 100° to 200° C., and where R is $C_4H_9$ and M is $Na^+$, $Li^+$, $K^+$ or $H^+$.

26. A process according to claim 24, wherein silica is added to the starting zeolite prior to the treatment with the bases.

27. A process according to claim 25, wherein silica is added to the starting zeolite prior to the treatment with the bases.

28. A process according to claim 7, wherein the starting zeolite immediately prior to the treatment with the bases has a crystal size which ranges from 0.5 to 6 microns, the reaction mixture before conversion has a $SiO_2/Al_2O_3$ ratio which ranges from 20 to 150, has a molar ratio of $H_2O/OH^-$ which ranges from 30 to 300, has a molar ratio of $OH^-/SiO_2$ which ranges from 0.2 to 0.8, has a molar ratio of $R_4N^+/SiO_2$ which ranges from 0.05 to 0.2, has a molar ratio of $M/M+R_4N^+$ which ranges from 0.8 to 0.1, the duration of the treatment with the bases ranges from 20 to 120 hours, the temperature of the treatment with the bases ranges from 120° to 180° C., and where R is $C_3H_7$ and M is $Na^+$, $Li^+$, $K^+$ or $H^+$.

29. A process according to claim 3, wherein the starting zeolite contains the cations which are generally present in natural or synthetic zeolites, the cations present in the starting zeolite are exchanged with hydrogen, ammonium, lithium or potassium ions prior to the treatment with the bases, the starting zeolite immediately prior to the treatment with the bases has a crystal size which ranges from 0.5 to 6 microns, the reaction mixture before conversion has a $SiO_2/Al_2O_3$ ratio which ranges from 20 to 150, has a molar ratio of $H_2O/OH^-$ which ranges from 50 to 300, has a molar ratio of $OH^-/SiO_2$ which ranges from 0.1 to 0.4, has a molar ratio of $R_4N^+/SiO_2$ which ranges from 0.05 to 0.3, has a molar ratio of $M/M+R_4N^+$ which ranges from 0.7 to 0.3, the duration of the treatment with the bases ranges from 20 to 120 hours, the temperature of the treatment with the bases ranges from 120° to 180° C., and where R is $C_4H_9$ and M is $Na^+$, $Li^+$, $K^+$ or $H^+$.

30. A process according to claim 1, wherein the zeolite subjected to treatment is already conditioned by means of agglomeration into pellets, granules, extrudes and the like.

31. A process according to claim 1, wherein the zeolite subjected to treatment is already conditioned by means of agglomeration into pellets, granules, extrudes and the like without a binder.

32. A process according to claim 2, wherein the zeolite subjected to treatment is already conditioned by means of agglomeration into pellets, granules, extrudes and the like.

33. A process according to claim 2, wherein the zeolite subjected to treatment is already conditioned by means of agglomeration into pellets, granules, extrudes and the like without a binder.

34. A process according to claim 3, wherein the zeolite subjected to treatment is already conditioned by means of agglomeration into pellets, granules, extrudes and the like.

35. A process according to claim 3, wherein the zeolite subjected to treatment is already conditioned by means of agglomeration into pellets, granules, extrudes and the like without a binder.

* * * * *